(12) United States Patent
Nishimoto et al.

(10) Patent No.: US 6,484,581 B2
(45) Date of Patent: Nov. 26, 2002

(54) ULTRASONIC TRANSCEIVER AND VEHICLE'S SURROUNDING OBSTRUCTION SENSOR

(75) Inventors: Yukio Nishimoto, Tokyo (JP); Akiharu Fukuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/774,876

(22) Filed: Feb. 1, 2001

(65) Prior Publication Data

US 2001/0020389 A1 Sep. 13, 2001

(30) Foreign Application Priority Data

Feb. 2, 2000 (JP) .......................... 2000-025292
Dec. 18, 2000 (JP) .......................... 2000-383068

(51) Int. Cl.$^7$ ................................ G01N 29/00
(52) U.S. Cl. ................ 73/579; 73/598; 73/602; 73/627
(58) Field of Search ................ 73/632, 598, 432.1, 73/597, 602, 627, 649, 579

(56) References Cited

U.S. PATENT DOCUMENTS

| 4,528,563 | A | * | 7/1985 | Takeuchi | 340/903 |
| 5,347,273 | A | * | 9/1994 | Katiraie | 340/903 |
| 6,085,592 | A | * | 7/2000 | Kawashima | 73/632 |
| 6,128,576 | A | * | 10/2000 | Nishimoto et al. | 701/301 |

FOREIGN PATENT DOCUMENTS

| JP | 10-332817 | 12/1998 | ........... G01S/7/521 |

* cited by examiner

Primary Examiner—Hezron Williams
Assistant Examiner—Jacques M. Saint-Surin
(74) Attorney, Agent, or Firm—Sughrue Mion, PLLC

(57) ABSTRACT

A ultrasonic transceiver includes a case for housing a ultrasonic sensor having a transducer provided therein, and a resilient member to be interposed between the case and an ultrasonic sensor. The surface of the case opposing the side surface of the ultrasonic sensor is tapered with respect to the surface of the ultrasonic sensor without involvement of the resilient member.

9 Claims, 5 Drawing Sheets

ULTRASONIC TRANSCEIVER AND VEHICLE'S SURROUNDING OBSTRUCTION SENSOR

BACKGROUND OF THE INVENTION

1. Field of the Invention

The present invention relates to a device for transmitting and receiving ultrasonic waves. More particularly, the present invention relates to, for example, an ultrasonic transceiver and a vehicle-surroundings obstruction sensor which are to be used in an obstruction detection system mounted in a vehicle bumper for sensing obstructions located around the vehicle.

2. Description of the Related Art

Ultrasonic transceiver sensors for sensing obstructions located around a vehicle have hitherto been known. More specifically, ultrasonic transceiver sensors are mounted in a bumper of a vehicle, and ultrasonic waves are transmitted from the rear portion or corners of the vehicle. Ultrasonic waves reflected from obstructions are received by the transceiver sensors, thereby detecting the obstructions. Within each ultrasonic sensor, an ultrasonic vibrator is built into a case, and a disc-shaped oscillation plane is also provided. By application of a voltage to the ultrasonic sensor, the ultrasonic vibrator undergoes oscillation by means of the piezoelectric effect, thus transmitting an ultrasonic signal. Upon receipt of the ultrasonic signal reflected from the obstruction, a piezoelectric element provided in the ultrasonic sensor produces a voltage by means of the reverse voltage effect.

Further, there have commonly been employed ultrasonic sensors provided in the front section of the vehicle for detecting obstructions located around the front section of a vehicle.

FIG. 8A is a cross-sectional view of a related-art ultrasonic transceiver sensor 80 when viewed from the side. FIG. 8B is a cross-sectional view of the same when viewed from the top. A known ultrasonic transceiver sensor has a piezoelectric transducer element provided therein. Further, the ultrasonic transceiver sensor comprises an ultrasonic sensor 81 for transmitting and receiving ultrasonic waves; a control board 82 for controlling the ultrasonic sensor 81; external input/output wiring 83 for connecting the control board 82 to an external ECU for vehicle use; and a case 84 for housing therein the ultrasonic sensor 81 and other elements. Particularly, the case 84 is provided with an opening section 85. The opening section 85 is formed so as to assume an oval-horn-shaped cross section for improving the directivity of ultrasonic waves transmitted from the ultrasonic sensor.

A rubber holder 86 is provided a round the ultrasonic sensor 81 such that the ultrasonic sensor 81 is secured and can undergo oscillation. A received-wave amplifier AMP 87 is mounted on the control board 82 for amplifying the signal received by the ultrasonic sensor 81.

Other related-art technologies are as follows: Japanese Patent Application Laid-Open No. 182571/1983 describes an obstruction sensor comprising an ultrasonic transmitter and an ultrasonic receiver that are provided separately and whose respective characteristics are changed. Japanese Patent Application Laid-Open No. 148975/1985 describes an ultrasonic sensor, in which an electronic component and elastic filler are provided in the base section of a horn. Japanese Utility Model Application Laid-Open No. 12686/1987 describes a vehicle rear monitor using a rear bumper as an ultrasonic block wall. Japanese Patent Application Laid-Open No. 284896/1997 describes an ultrasonic transceiver, in which the shape and thickness of a case for housing a piezoelectric transducer are controlled so as to provide directivity. Further, Japanese Patent Application Laid-Open No. 332817/1998 describes an ultrasonic sensor for preventing erroneous assembly, by means of rendering the longitudinal geometry of a housing of an ultrasonic vibrator different from that of the housing.

In a related-art ultrasonic transceiver, when a horn is formed into such a geometry as to provide directivity, ultrasonic wave are attenuated by the horn. Alternatively, the overall length of the ultrasonic transceiver becomes longer, and the horn section becomes prone to clogging with dirty snow.

Even when an attempt is made to control the geometry of a housing of a vibrator of the ultrasonic sensor so as to provide directivity, sufficient directivity is not achieved, the geometry of the housing or the geometry of a horn becomes complicated, or processes for forming the housing or the horn become complicated.

SUMMARY OF THE INVENTION

The present invention has been conceived to solve the aforementioned problems and provides an ultrasonic transceiver providing directivity by means of a simple construction.

The present invention is aimed at providing a sensor for detecting obstructions located around a vehicle, wherein the sensor has a detection area suitable for detecting obstructions located behind the vehicle.

The present invention provides a ultrasonic transceiver comprising:

a ultrasonic sensor provided with a transducer;

a case for housing the ultrasonic sensor therein; and a resilient member to be interposed between the case and an ultrasonic sensor, wherein the surface of the case opposing a side surface of the ultrasonic sensor is tapered with respect to a surface of the ultrasonic sensor without involvement of the resilient member.

The present invention also provides a ultrasonic transceiver comprising:

a ultrasonic sensor provided with a transducer;

a case for housing the ultrasonic sensor therein;

a resilient member to be interposed between the case and an ultrasonic sensor; and a tapered section which is formed in the case and opposes the side surface of the ultrasonic sensor exposed from the resilient member, wherein ultrasonic waves transmitted from the ultrasonic sensor are reflected from the tapered section and transmitted in substantially a forward direction of the ultrasonic sensor.

The present invention provides a vehicle-surroundings obstruction sensor comprising:

an ultrasonic transceiver including a case for housing a ultrasonic sensor having a transducer provided therein, a resilient member to be interposed between the case and an ultrasonic sensor, and a tapered section which is formed in the case and opposes the side surface of the ultrasonic sensor exposed from the resilient member; and a determination section for determining whether or not obstructions are present, by means of a signal output from the ultrasonic transceiver; wherein ultrasonic waves transmitted from the ultrasonic sensor are reflected from the tapered section and transmitted to the surroundings of the vehicle, so that the determination section detects obstructions located in the surroundings of the vehicle.

Preferably, an end section of the tapered section is flush with or higher than an end section of the side surface of the ultrasonic sensor.

DETAILED DESCRIPTION OF THE PREFERRED EMBODIMENTS

Now, a description will be given in more detail of preferred embodiments of the invention with reference to the accompanying drawings.

Figure 1:
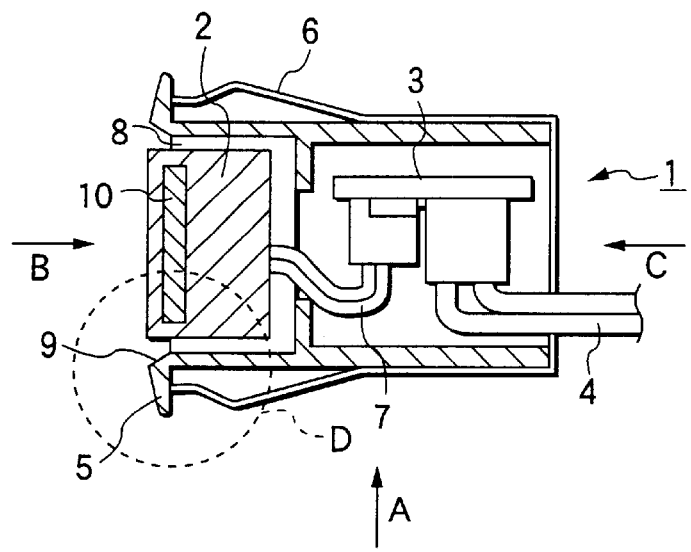
FIG. 1 is a fragmentary cross-sectional view of an ultrasonic transceiver according to a first embodiment of the present invention when viewed from the top.
Figure 2:
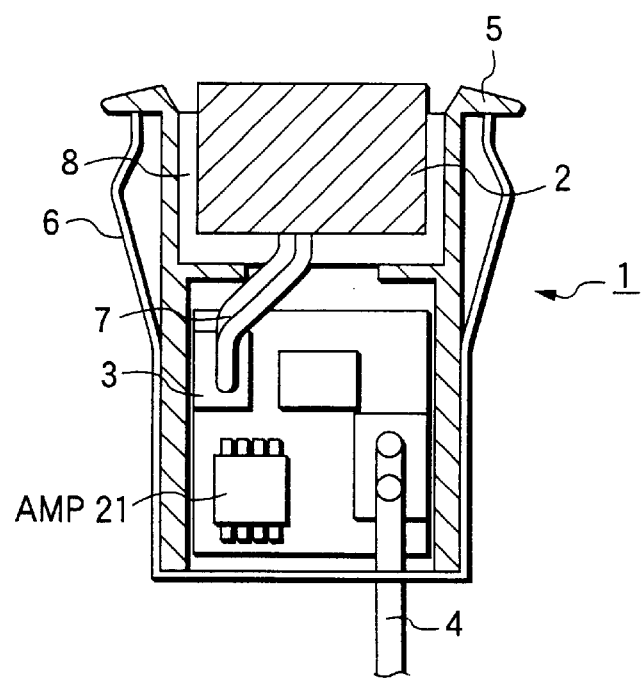
FIG. 2 is a fragmentary cross-sectional view of the same when viewed from the direction designated by arrow A shown in FIG. 1.
Figure 3A:
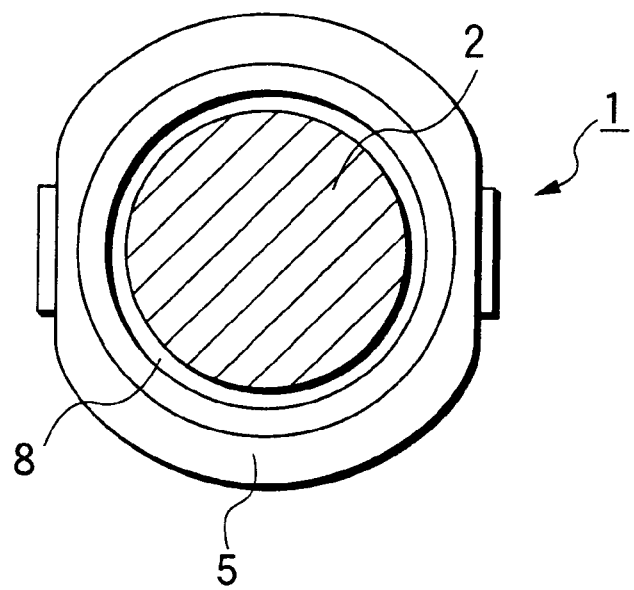
FIG. 3A is a front view of the same when viewed from the direction designated by arrow B shown in FIG. 1.
Figure 3B:
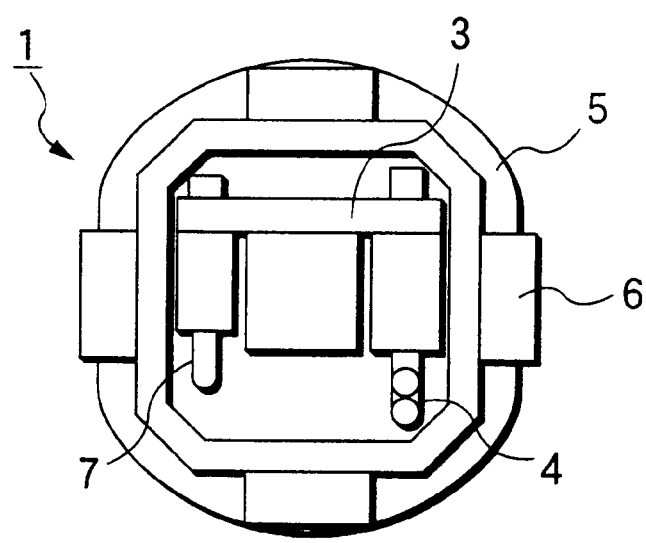
FIG. 3B is a rear view of the same when viewed from the direction designated by arrow C shown in FIG. 1.

An embodiment of the present invention for implementing the present invention will be described below. FIG. 1 is a fragmentary cross-sectional view of an ultrasonic transceiver according to the present invention when viewed from the top. FIG. 2 is a fragmentary cross-sectional view of the same when viewed from the direction designated by arrow A shown in FIG. 1. FIG. 3A is a front view of the same when viewed from the direction designated by arrow B shown in FIG. 1, and FIG. 3B is a rear view of the same when viewed from the direction designated by arrow C.

Figure 4:
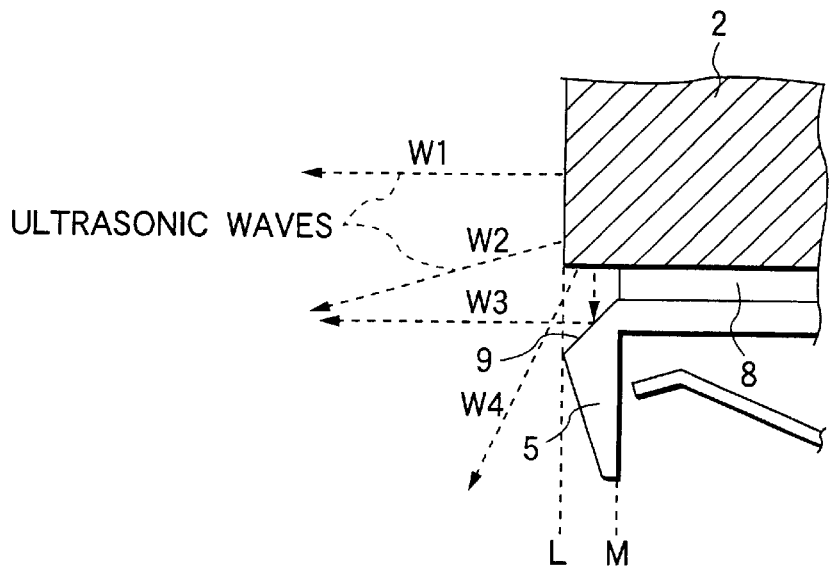
FIG. 4 is an illustration for describing the state of ultrasonic transmission effected within the range defined by broken circular lines D shown in FIG. 1.
Figure 5A:
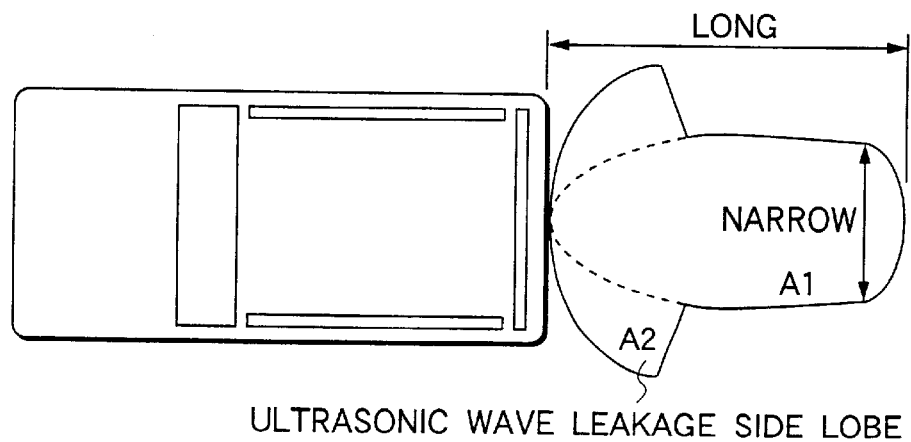
FIGS. 5A and 5B are descriptive illustrations showing an example of transmission range of an ultrasonic sensor.
Figure 5B:
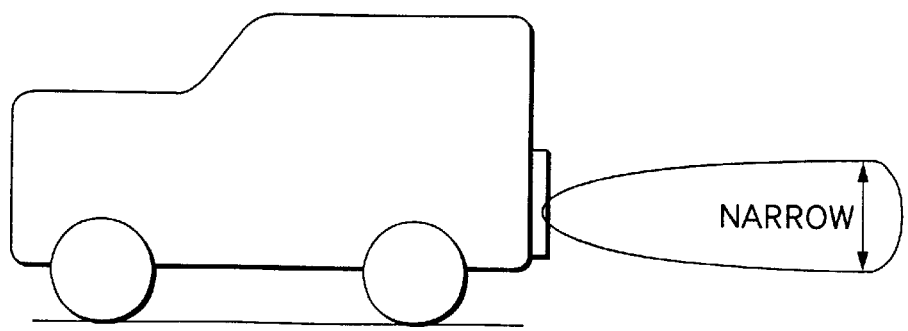

FIG. 4 is an illustration for describing the state of ultrasonic transmission effected within the range defined by broken circular lines D shown in FIG. 1. FIGS. 5A and 5B are descriptive illustrations showing an example of transmission range of an ultrasonic sensor used-for detecting obstructions located rearward of a vehicle.

In the drawings, reference numeral 1 designates an ultrasonic transceiver which is mounted in a rear bumper of a vehicle, oscillates ultrasonic waves rearward from the vehicle (i.e., outputs ultrasonic waves), and receives the ultrasonic waves reflected from obstructions, thereby detecting the obstructions. Direction of detection (i.e., transmission direction) is the leftward direction in FIG. 1, the upward direction in FIG. 2, toward the viewer in FIG. 3A, and away from the viewer in FIG. 3B. Reference numeral 2 designates an ultrasonic sensor which incorporates a piezoelectric transducer element 10 and transmits and receives ultrasonic waves; and 3 designates a control board which controls transmission and receipt operations of the ultrasonic sensor 2 and transmits a signal to an external ECU for vehicle use. Reference numeral 4 designates external input/output wiring to be used for connecting the control board 3 to an external ECU for vehicle use.

Reference numeral 5 designates a resin-made case for housing therein the ultrasonic sensor 2; and 6 designates a spring which is mounted on the outside of the case 5 and is to be used for securing the case 5 within an insert hole formed in a bumper of a vehicle, by means of restoration force of the spring.

Reference numeral 7 designates internal input/output wiring to be used for connecting the ultrasonic sensor 2 to the control board 3. Reference numeral 8 designates a rubber holder which is filled into a clearance between the peripheral surface of the ultrasonic sensor 2 and the case 5, to thereby secure the ultrasonic sensor 2 in an vibratory manner, and which acts as an elastic member for securing the ultrasonic sensor 2, to thereby prevent transmission of oscillation to the case 5. The rubber holder 8 is formed from resin (rubber is optimal) having an elastic characteristic which enables appropriate oscillation of the ultrasonic sensor 2. The rubber holder 8 may be formed from a material other than resin, so long as the material possesses an elastic characteristic which enables appropriate oscillation of the ultrasonic sensor 2.

Reference numeral 9 designates a tapered section formed on the surface of the case 5 opposing the ultrasonic sensor. The tapered section 9 reflects the ultrasonic waves transmitted from the ultrasonic sensor 2. As shows in FIG. 4, in terms of preventing direct leakage of ultrasonic waves in a solely lateral direction from the ultrasonic sensor 2, the end of the tapered section 9 is preferably located in line with an imaginary extension of the front surface of the ultrasonic sensor 2 (designated by dashed line L shown in FIG. 4) or forward relative to the imaginary extension (i.e., the leftward direction in FIG. 4). The position of the end is moved back and forth, to thereby broaden or narrow an obstruction sensing range A2 to be described later. Thus, the obstruction sensing range A2 is adjusted so as to fit a product to which ultrasonic sensor is to be applied.

The tapered section 9 formed in the ultrasonic sensor 2 makes the ultrasonic sensor 2 less vulnerable to clogging by snow or mud as compared with the ultrasonic sensor 2 not having a tapered section, thus preventing changes in the obstruction sensing characteristic of the ultrasonic sensor 2, which would other wise be caused when the sensor 2 is clogged with mud or snow.

Preferably, the tapered section 9 is formed from material which is likely to reflect ultrasonic waves. Alternatively, material of the case 5 may be selected in consideration of a characteristic of reflecting ultrasonic waves, or the tapered section 9 may be formed from another material which is more likely to reflect ultrasonic waves.

Reference numeral 21 designates a received-wave amplifier AMP which amplifies a signal received by the ultrasonic sensor 2 so that a vehicle-mounted ECU or other device can process the signal.

The operation of the ultrasonic transceiver will now be described.

When a driver shifts gear to reverse in order to back the vehicle into a garage, a vehicle-mounted ECU detects that the vehicle has entered a rearward traveling state. The ECU issues an instruction to the control board 3 for outputting ultrasonic waves from the ultrasonic sensor 2, by way of the external input/output wiring 4. Upon receipt of the instruction, the control board 3 outputs, to the ultrasonic sensor 2 by way of the internal input/output wiring 7, a battery current on which a signal output from the vehicle-mounted ECU by way of the external input/output wiring 4 is superimposed. By means of the battery current, the piezoelectric transducer 10 provided in the ultrasonic sensor 2 is caused to vibrate for a certain period of time. Oscillation of the piezoelectric transducer 10 is transmitted to the ultrasonic sensor 2, and ultrasonic waves develop in the surface of the ultrasonic sensor 2, except the area of the sensor 2 covered by the rubber holder 8.

When obstructions are present along the direction in which the thus-developed ultrasonic waves travel, the ultrasonic waves are reflected from the obstructions. The thus-reflected ultrasonic waves return to the ultrasonic sensor 2 with a time lag corresponding to the distance between the ultrasonic sensor 2 and the obstructions.

The ultrasonic waves which have returned to the ultrasonic sensor 2 vibrate the ultrasonic sensor 2, and the resultant oscillation propagates to the piezoelectric transducer 10 provided within the ultrasonic sensor 2. An electric current then develops in the piezoelectric transducer 10, and the current is amplified by the received-wave amplifier AMP 21 mounted on the control board 3. The thus-amplified current is delivered to the vehicle-mounted ECU by way of the external input/output wiring 4. Detection of obstructions or determination of locations of the obstructions (distances to the obstructions from the sensor) can be detected by detection of reflected waves or a time lag from emission of the ultrasonic waves until return of the reflected waves to the ultrasonic sensor.

The ultrasonic waves emitted from the ultrasonic sensor 2 will be described by reference to FIG. 4. Further, the ultrasonic waves will be described by comparison with FIG. 6 (which is a reference drawing), as required.

Since the ultrasonic sensor 2 is constructed so as to emit ultrasonic waves with a certain degree of directivity (i.e., the housing of the ultrasonic sensor 2 is formed so as to embody directivity matching an object of detection), ultrasonic waves are emitted, as designated by W1 and W2 shown in FIG. 4. The descriptions thus far apply to FIG. 6.

The ultrasonic sensor (i.e., the housing) usually assumes a cylindrical geometry. However, the directivity of ultrasonic oscillation can be changed in accordance with application, by means of forming a notch in the sensor or changing the layout of a transducer to be provided in the sensor.

In FIG. 4, since a portion of the side surface of the ultrasonic sensor 2 is exposed to the rubber holder 8, ultrasonic waves are emitted from the thus-exposed portion of the side surface, as designated by W3 and W4.

First, ultrasonic wave W3 will be described. The ultrasonic wave emitted from the side surface of the ultrasonic sensor 2 is reflected by the tapered section 9 of the case 5. By means of reflection from the tapered surface 9, the propagation direction of the ultrasonic sensor 2 is changed, and the ultrasonic wave is emitted forward in relation to the ultrasonic sensor (i.e., in the leftward direction shown in FIG. 4).

Next, ultrasonic wave W4 will be described. Of the ultrasonic waves emitted from the side surface of the ultrasonic sensor 2, ultrasonic wave W4 is emitted at an angle at which the wave is not reflected from the tapered section 9 or the case 5 and is emitted in a forward oblique direction in relation to the ultrasonic sensor (i.e., in the lower left direction in FIG. 4).

Figure 6:
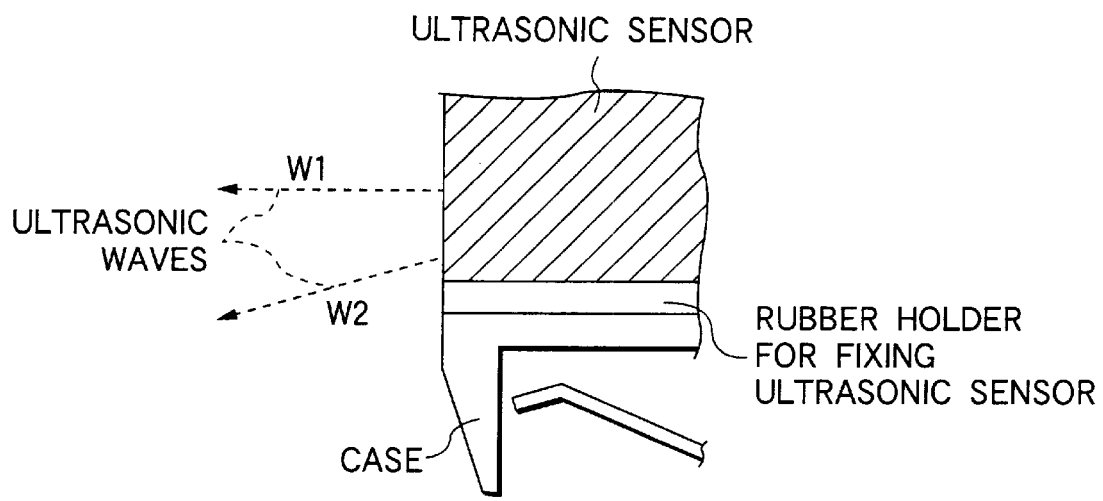
FIG. 6 is a reference illustration to be compared with FIG. 4.

In FIG. 6, The entire side surface of the ultrasonic sensor 2 is covered with a rubber holder, and no tapered section is formed in the case. Hence, ultrasonic waves corresponding to W3 and W4 shown in FIG. 4 do not arise.

Referring to FIGS. 5A and 5B and FIGS. 7A and 7B, there will be described a difference in obstruction sensing ranges stemming from a difference between the manners for emitting ultrasonic waves, the difference in relation to emission having been described by comparison between FIG. 4 and FIG. 6.

Figure 7A:
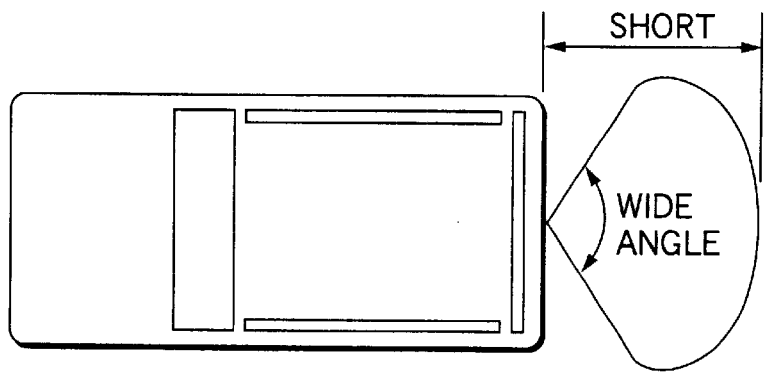
FIGS. 7A and 7B are reference illustrations to be compared with FIGS. 5A and 5B.
Figure 7B:
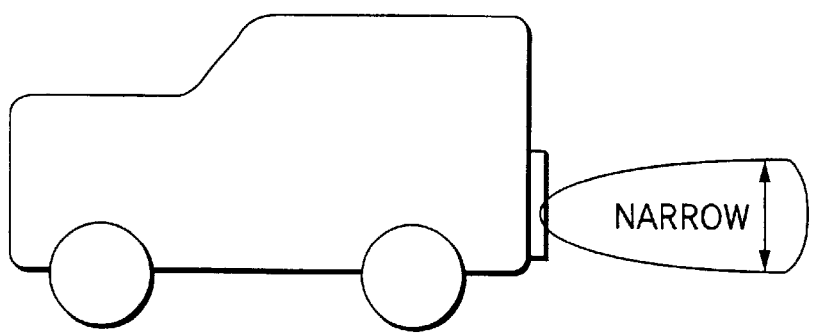
Figure 8A:
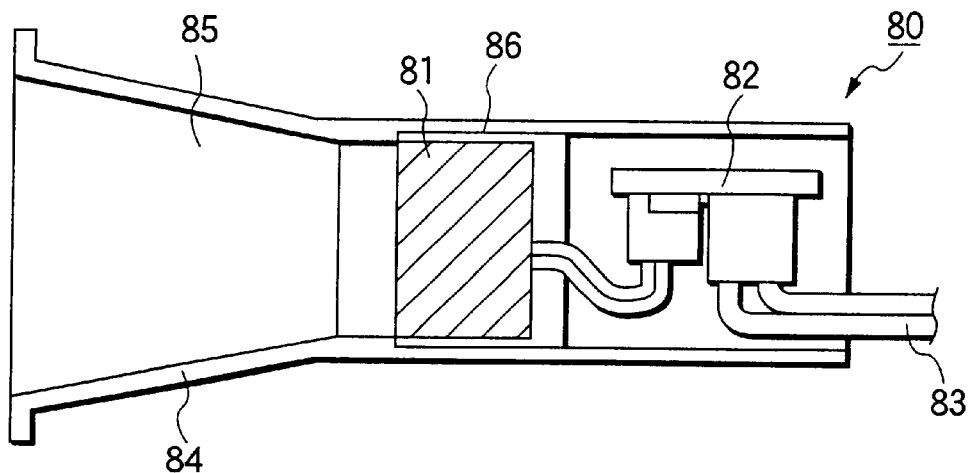
FIG. 8A is a cross-sectional view of a related-art ultrasonic sensor when viewed from the top.
Figure 8B:
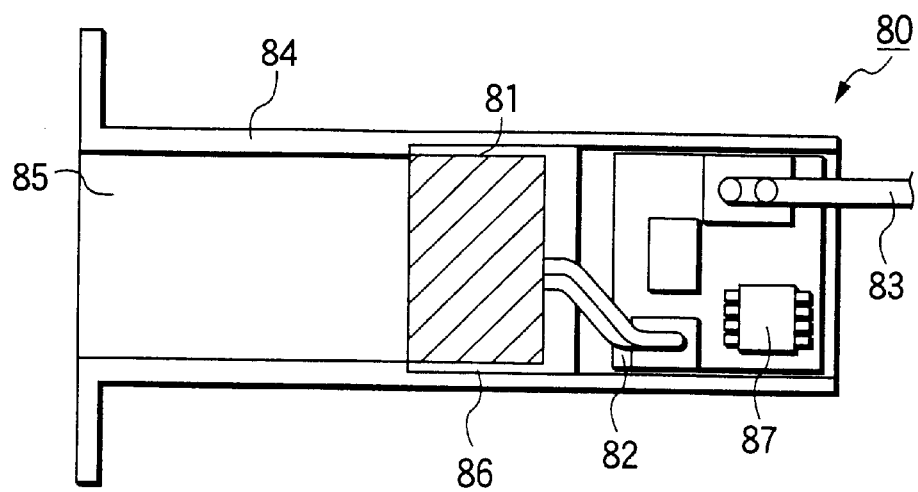
FIG. 8B is a cross-sectional view of the same when viewed from the side.

FIGS. 5A and 5B show an obstruction sensing range within which obstructions are detected by means of emission of ultrasonic waves, as shown in FIG. 4. FIGS. 7A and 7B show an obstruction sensing range in which obstructions are detected by means of emission of ultrasonic waves, as shown in FIG. 6.

As can be seen from comparison between FIGS. 5A and 5B and FIGS. 7A and 7B, the obstruction sensing ranges greatly differ in shape from each other. FIG. 7A shows an obstruction sensing range formed less deep with a wide angle. FIG. 5A shows an obstruction sensing range formed by combination of two obstruction sensing ranges; that is, an obstruction sensing range (depicted by A1 shown in FIG. 5A) which is formed deeper and with a smaller angle than that shown in FIG. 7A, and an obstruction sensing range (depicted by. A2 shown in FIG. 5A) which is formed less deep and with a greater angle than that shown in FIG. 7A.

The obstruction sensing range A1 shown in FIG. 5A is formed from ultrasonic waves such as those described in connection with W1, W2, and W3 shown in FIG. 4. Particularly, ultrasonic waves W2 and W3 interfere with each other, thereby preventing widthwise extension of the obstruction sensing range and enabling longitudinal extension of the same. Accordingly, there can be produced the obstruction sensing range A1 shown in FIG. 5A.

The obstruction sensing range A2 shown in FIG. 5A is formed by combination of ultrasonic waves W2 and W4 shown in FIG. 4. Since ultrasonic waves W2 and W3 interfere with each other, ultrasonic wave W4 becomes dominant. The obstruction sensing range and the intensity thereof are determined by means of the positional relationship between the case 5 and the tapered section 9 of the ultrasonic sensor 2.

The obstruction sensing range A1 primarily consisting of ultrasonic wave W1 emitted from the front surface of the ultrasonic sensor 2 is superior to the obstruction sensing range A2 primarily consisting of ultrasonic wave W4 emitted from the side surface of the ultrasonic sensor 2, in terms of intensity of ultrasonic waves and obstruction sensing capability.

The obstruction sensing ranges A1 and A2 shown in FIG. 5B are identical in elevation angle with the obstruction sensing range shown in FIG. 7B. This can be realized by means of adjusting the geometry of the housing of the ultrasonic sensor 2. By means of narrowing the angle of elevation in relation to the angle of depression of the obstruction sensing range, there is prevented a detection failure that would otherwise be caused by means of reflecting ultrasonic waves from the ground surface.

As shown in FIGS. 2 and 3A, the tapered section 9 is formed over the entire periphery of the case 5. However, in a case where ultrasonic waves emitted in the vertical direction are weakened by the geometry of the housing of the ultrasonic sensor 2 and weak ultrasonic waves are emitted from the side surface in the vertical direction; for example, when ultrasonic waves are less intensive than those used for detecting obstructions within the horizontal obstruction sensing range A2, erroneous detection of the ground surface would be prevented even if the tapered section 9 is formed over the entire periphery of the case 5.

Since the tapered section 9 is formed over the entire periphery of the ultrasonic sensor 2 (i.e., in the vertical and horizontal directions), ultrasonic waves emitted from the vertical and horizontal side surfaces can be reflected forward as are ultrasonic wave W3 shown in FIG. 4, thus increasing the intensity of forward ultrasonic waves.

The deeper the cone angle of the tapered section 9 (designated by M shown in FIG. 4), the more ultrasonic waves emitted from the side surface of the ultrasonic sensor 2 can be emitted to the front surface. Thus, ultrasonic waves to be emitted toward the front surface can be made more intense.

When the tapered section 9 assumes a cone angle of about 45° with respect to the side surface of the ultrasonic sensor 2, ultrasonic waves of maximum intensity can be emitted forward. The greater the cone angle, the greater the horizontal width of the case 5.

The depth and cone angle of the tapered section 9 and the size of the case 5 may be designed in accordance with the characteristic of the respective product.

If the tapered section 9 is removed from the positions on the ultrasonic sensor 2 in the vertical direction and the ultrasonic sensor 2 is covered with the rubber holder 8, the tapered section 9 remains only in the positions on the sensor 2 in the horizontal direction. As a result, ultrasonic waves to be emitted forward become weaker. However, erroneous detection of the ground surface can be lessened.

In the present embodiment, the tapered section 9 is formed over the entire surface of the case 5 opposing the side surface of the ultrasonic sensor 2 exposed from the rubber holder 8. A tapered surface may be formed in a part of the surface of the case 5 opposing the ultrasonic sensor 2, and the remaining surface of the case 5 may be formed into a surface parallel to or perpendicular to the ultrasonic sensor 2.

The ultrasonic transceiver embodied in the manner mentioned above can set up a range for sensing over a long distance in the forward direction and a range for sensing over a comparatively short distance in the horizontal direction. Particularly, when the ultrasonic transceiver is used in a vehicle rearward obstruction sensing system, obstructions located distant in the direct rear direction from the vehicle can be detected without fail. Further, of the obstructions located to the left and right sides in the rearward direction, obstructions located near the vehicle can be detected without fail. Obstructions located distant from the vehicle are not detected. Thus, the vehicle rear obstruction sensing system can be imparted with a characteristic suitable for sensing obstructions located rearward of the vehicle.

In a vehicle rear obstruction sensing system, distance to obstructions located in the direct rear direction must be reported to a driver, as in the case of detection of a rearward wall surface of a garage when a vehicle is backed into the garage. For this reason, emission of intensive ultrasonic waves to a distance is required. However, detection of obstructions located distant in the left and-right rearward direction is not required, as in the case of detection of the left- and right-side wall surfaces of the garage when the vehicle is backed into the garage (particularly, when the vehicle is backed into a narrow garage, the left- and right-side wall surfaces of the garage may be detected erroneously with high possibility). Within the areas in the vicinity of the rear left and right directions, obstructions may be located in the driver's blind spots. Sensing of such obstructions is desired.

In an ultrasonic transceiver according to the present invention, at least a portion of the surface of the case opposing the side surface of the ultrasonic sensor is tapered with respect to the side surface of the ultrasonic sensor without involvement of a resilient member, thus enabling effective utilization of ultrasonic waves transmitted from the side surface of the ultrasonic sensor.

The ultrasonic waves transmitted from the side surface of the ultrasonic sensor are reflected from a tapered section, and the thus-reflected ultrasonic waves are transmitted in substantially a forward direction of the ultrasonic sensor, thus enabling effective utilization of the ultrasonic waves emitted from the side surface of the ultrasonic sensor.

A vehicle-surroundings obstruction sensor according to the present invention comprises an ultrasonic transceiver including a tapered section formed in a case and opposing the side surface of the ultrasonic sensor exposed from a resilient member; and a determination section for determining whether or not obstructions are present, by means of a signal output from the ultrasonic transceiver, wherein ultrasonic waves emitted from the ultrasonic sensor are reflected from the tapered section and transmitted to substantially the direct rear of the vehicle, thus embodying a sensing range appropriate for sensing obstructions located in the surroundings of the vehicle.

The end section of the tapered section is formed flush with the end section of the side surface of the ultrasonic sensor. Hence, the tapered section enables realization of a sensing range appropriate for sensing obstructions located in the surroundings of the vehicle.

What is claimed is:

1. An ultrasonic transceiver comprising:

an ultrasonic sensor provided with a transducer;

a case for housing said ultrasonic sensor therein; and a resilient member interposed between said case and said ultrasonic sensor, wherein a surface of said case opposing a side surface of said ultrasonic sensor is tapered with respect to a surface of said ultrasonic sensor without involvement of the resilient member, to form a tapered section, and wherein ultrasonic waves transmitted from said ultrasonic sensor are reflected from the tapered section.

2. The ultrasonic receiver of claim 1, wherein the resilient member is a rubber holder.

3. The ultrasonic transceiver of claim 1, wherein an angle of the tapered section is adjusted.

4. The ultrasonic transceiver of claim 3, wherein the angle of the tapered section is adjusted according to the use or placement of the ultrasonic transceiver on a vehicle.

5. An ultrasonic transceiver comprising:

an ultrasonic sensor provided with a transducer;

a case for housing said ultrasonic sensor therein;

a resilient member interposed between said case and said ultrasonic sensor; and a tapered section which is formed in said case and opposes a side surface of said ultrasonic sensor exposed from said resilient member, wherein ultrasonic waves transmitted from said ultrasonic sensor are reflected from the tapered section and transmitted in substantially a forward direction of said ultrasonic sensor.

6. The ultrasonic receiver of claim 5, wherein an end of said tapered section is in line with a front surface of said ultrasonic sensor.

7. The ultrasonic receiver of claim 5, wherein said tapered section is formed from a first material and said case is formed from a second material, wherein said first material is more reflective of said ultrasonic waves than said second material.

8. A vehicle-surroundings obstruction sensor comprising:

an ultrasonic transceiver including a case for housing an ultrasonic sensor having a transducer provided therein, a resilient member interposed between said case and said ultrasonic sensor, and a tapered section which is formed in said case and opposes a side surface of said ultrasonic sensor exposed from said resilient member; and a determination section for determining whether obstructions are present, or not, according to a signal output from the ultrasonic transceiver, wherein ultrasonic waves transmitted from said ultrasonic sensor are reflected from the tapered section and transmitted to the surroundings of the vehicle, so that said determination section detects the obstructions located in the surroundings of the vehicle.

9. The vehicle-surroundings obstruction sensor according to claim 8, wherein an end section of the tapered section is flush with an end section of the side surface of said ultrasonic sensor.

* * * * *